United States Patent
Buzsaki

(10) Patent No.: US 6,334,193 B1
(45) Date of Patent: *Dec. 25, 2001

(54) METHOD AND APPARATUS FOR IMPLEMENTING USER-DEFINABLE ERROR HANDLING PROCESSES

(75) Inventor: George Buzsaki, Fremont, CA (US)

(73) Assignee: Oracle Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,527

(22) Filed: May 29, 1997

(51) Int. Cl.[7] .................................................. H02H 3/05
(52) U.S. Cl. .............................. 714/2; 714/48; 714/49; 714/57
(58) Field of Search ............................... 395/181, 185.1, 395/182.09, 185.01, 185.02; 714/2, 57, 48, 49

(56) References Cited

U.S. PATENT DOCUMENTS

| | | | |
|---|---|---|---|
| 4,807,108 | * | 2/1989 | Ben-Aruieh et al. ............ 364/148.01 |
| 5,193,189 | * | 3/1993 | Flood et al. .......................... 709/103 |
| 5,305,455 | * | 4/1994 | Anschuetz et al. .................. 395/670 |
| 5,483,637 | * | 1/1996 | Winokur et al. ................. 395/183.02 |
| 5,574,915 | * | 11/1996 | Lemon et al. ....................... 712/220 |
| 5,594,861 | * | 1/1997 | Johnson et al. ...................... 395/181 |
| 5,740,357 | * | 4/1998 | Gardiner et al. .................. 395/185.1 |
| 5,742,753 | * | 4/1998 | Nordsieck et al. ............. 395/182.09 |
| 5,790,843 | * | 8/1998 | Borkenhagen et al. ............. 712/226 |
| 5,819,022 | * | 10/1998 | Bandat ................................. 714/16 |
| 5,874,963 | * | 2/1999 | Johnson et al. ...................... 345/348 |

* cited by examiner

Primary Examiner—Mark Zimmerman
Assistant Examiner—Mackly Monestime
(74) Attorney, Agent, or Firm—Hickman Palermo Truong & Becker LLP; Brian D. Hickman; Craig G. Holmes

(57) ABSTRACT

A system is provided for handling an error by identifying an activity that generated the error. The system determines whether the activity has an associated user-defined error handling process. If the activity has an associated user-defined error handling process, then the system executes the associated user-defined error handling process. If the activity does not have an associated user-defined error handling process, then the system executes a default error handling process. A particular activity my have multiple associated user-defined error handling processes. The system selects among the multiple user-defined error handling processes using one or more error handling parameters. The system includes an activity execution module configured to execute process definitions and identify errors that occur when executing process definitions. The system also includes an error handling module coupled to the activity execution module and configured to determine whether a particular error has an associated user-defined error handling process.

22 Claims, 7 Drawing Sheets

FIG. 6

ITEM ACTIVITY STATUS TABLE 210

| PROCESS NAME 215 | PROCESS INSTANCE 220 | PROCESS ACTIVITY 225 | ACTIVITY STATUS 230 | ACTIVITY RESULT 235 | ERROR ENCOUNTERED 240 |
| --- | --- | --- | --- | --- | --- |

METHOD AND APPARATUS FOR IMPLEMENTING USER-DEFINABLE ERROR HANDLING PROCESSES

FIELD OF THE INVENTION

The present invention relates to error handling processes. More specifically, the invention provides a system that implements error handling processes defined by a user.

BACKGROUND

Computer systems typically execute an error handling process when an error or other failure in the system occurs. Typically, the manner in which the error or other failure is processed by the system is determined by the developer of the system or its components. For example, software applications and operating systems typically include various error handling processes defined by a developer. These error handling processes can generate an error message indicating that an error occurred and the type of error or the cause of the error. Alternatively, an error handling process can execute a diagnostic program that allows the user of the system to diagnose the error.

In existing systems, error handling processes are defined by the developer and handle the error in a manner prescribed by the developer. When developing these "built-in" error handling processes, the developer anticipates the manner in which the end-user (or the majority of end-users) will want the error processed. Additionally, the developer must anticipate all possible errors that might occur in the system, and define an error handling process for each possible error.

These "built-in" error handling processes provided by the system developer may not be complete or may not process a particular error in the manner desired by the end-user. For example, the developer may not identify all possible errors that can occur in the system. Additionally, the developer may not select the best error handling process to satisfy the preferences of a particular end-user. Furthermore, the error handling process selected by the developer may not take into consideration the configuration and requirements of a particular system or user. In systems that permit the end-user to create and execute custom routines (e.g., software routines) or procedures, it may be difficult for the developer to anticipate all possible error situations.

As discussed above, existing systems provide built-in error handling capabilities. However, these existing systems do not allow the end-user to define or implement a custom error handling routine. Instead, the end-user is limited to the error handling processes provided by the system developer. It is therefore desirable to provide a system that allows the end-user to define and execute custom error handling processes, which may replace or supplement the built-in error handling processes.

SUMMARY OF THE INVENTION

Embodiments of the present invention allow an end-user of a system (such as a computer system) to define one or more custom error handling processes. The end-user may associate multiple custom error handling processes with a particular error or activity. The particular error handling process to be executed is selected based on parameters provided to an error handling procedure or error handling module. Thus, rather than relying on built-in error handling processes, the user is able to define one or more custom error handling processes for each error or activity.

An embodiment of the invention identifies an activity that generated the error and determines whether the activity has an associated user-defined error handling process. A default error handling process is executed if the activity does not have an associated user-defined error handling process. The associated user-defined error handling process is executed if the activity has an associated user-defined error handling process.

Another embodiment of the invention provides multiple user-defined error handling processes associated with a particular activity.

One embodiment of the invention includes an activity execution module configured to execute process definitions and identify errors that occur when executing process definitions. This embodiment also includes an error handling module coupled to the activity execution module and configured to determine whether a particular error has an associated user-defined error handling process.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 6 illustrates an embodiment of an Item Activity Status (IAS) table in which status information is maintained during execution of a process.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Embodiments of the present invention allow an end-user of a system (such as a computer system) to define one or more custom error handling processes. Based on various errors or other failures that may occur in a system, the end-user is able to associate a particular error handling process with each possible error or activity. An activity may be any process, procedure, command, instruction, function, or other operation that may be performed by a system. The error handling process associated with each error may be the error handling process provided by the developer of the system (referred to as the "default error handling process") or may be a user-defined error handling process. Additionally, the user may associate multiple custom error handling processes with a particular error. The particular error handling process to be executed is selected based on parameters provided to an error handling procedure or error handling module. These parameters may represent the status of the system when the error occurred, time of day, or other factors selected by the user.

In many situations, the user of the system knows best how the errors should be handled. Therefore, the user is the best person to define error handling processes and determine the selection criteria for multiple error handling processes. Thus, the present invention allows different users of similar systems to configure the error handling processes differently such that the same error occurring under the same circumstances in two different systems is processed differently by each system based on the user's preferences.

Figure 1:
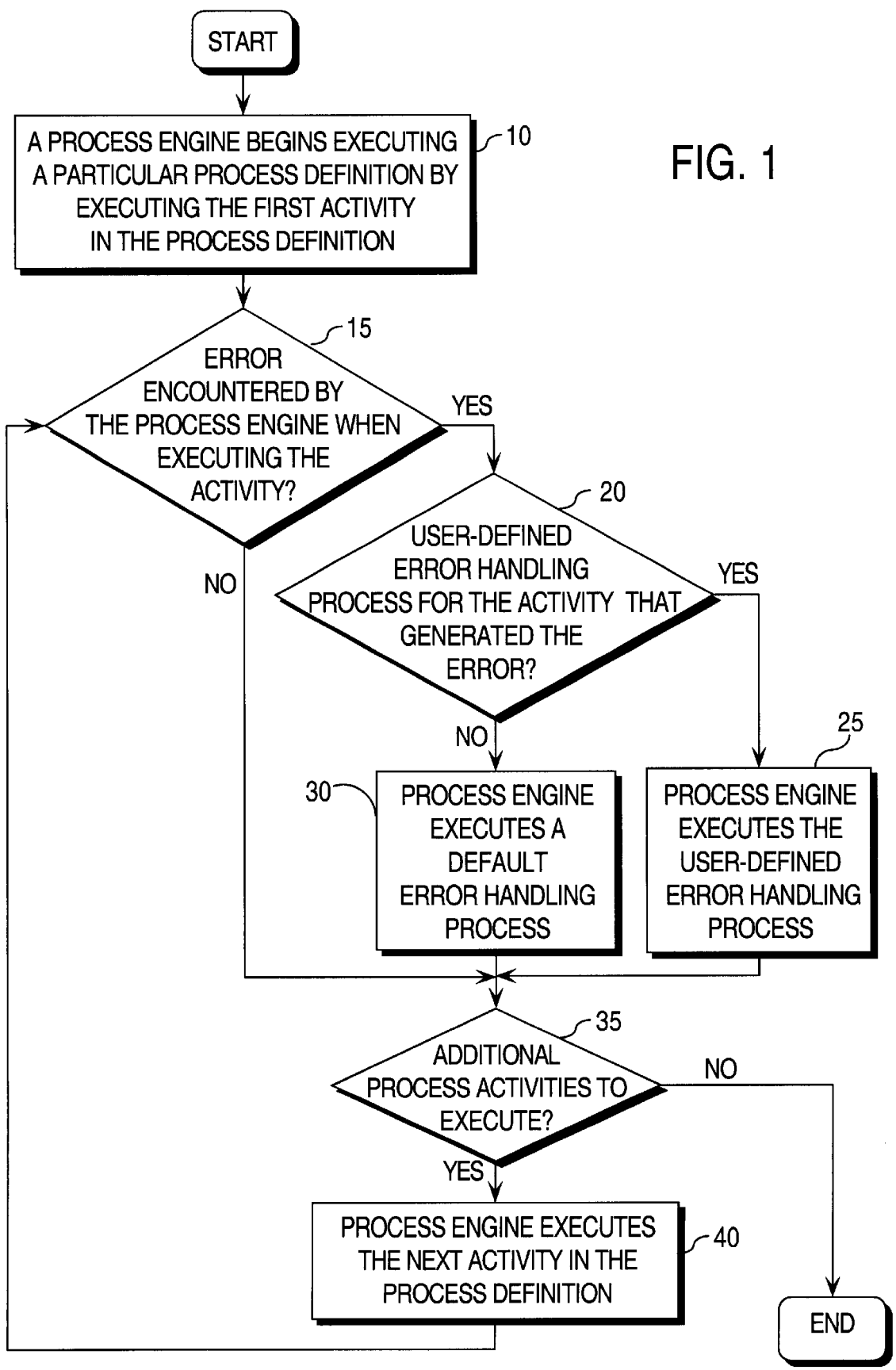
FIG. 1 is a flow diagram illustrating an embodiment of a procedure for detecting and handling errors.

FIG. 1 is a flow diagram illustrating an embodiment of a procedure for detecting and handling errors. At step 10, a process engine begins executing a particular process definition by executing the first activity in the process definition. A process engine can be any type of mechanism capable of executing process definitions, which includes invoking the appropriate activity logic or procedures. A process definition contains one or more activities to be executed and information regarding transitions from one activity to the next.

At step 15, the process engine determines whether an error was encountered when executing the particular activity. If no error was encountered, then the procedure continues to step 35 to determine whether additional process activities in the process definition remain to be executed. If an error was identified at step 15 by the process engine, then the procedure branches to step 20 where the process engine determines whether a user-defined error handling process is associated with the activity that generated the error. If the process engine determines at step 20 that a user-defined error handling process is associated with the activity that generated the error, the procedure branches to step 25 where the process engine executes the associated user-defined error handling process. Additional details regarding the execution of user-defined error handling processes are provided below. The procedure then continues to step 35, where the process engine determines whether additional process activities remain to be executed.

If, at step 20, the process engine determines that a user-defined error handling process has not been associated with the activity that generated the error, then the procedure continues to step 30 where the process engine executes a default error handling process. This default error handling process is typically provided by the developer of the system or software. Default error handling processes may perform any type of error handling, as specified by the developer of the system. In an embodiment of the invention, a particular default error handling process is a null procedure. The procedure then continues from step 30 to step 35, where the process engine determines whether any additional process activities remain to be executed.

If no additional activities remain to be executed at step 35, then the procedure terminates. If additional activities remain to be executed, the procedure continues from step 35 to step 40 where the process engine executes the next activity in the process definition. The procedure then returns to step 15, where the process engine determines whether an error was encountered when executing the next activity. The procedure illustrated in FIG. 1 continues executing activities in the process definition and testing for errors caused by those activities until no additional process activities remain to be executed.

In a particular embodiment of the invention, an error handling process is a workflow process and the process engine is capable of executing workflow processes. Users can create or modify a workflow process (i.e., a custom error handling process) using any type of workflow editing mechanism.

Figure 2:
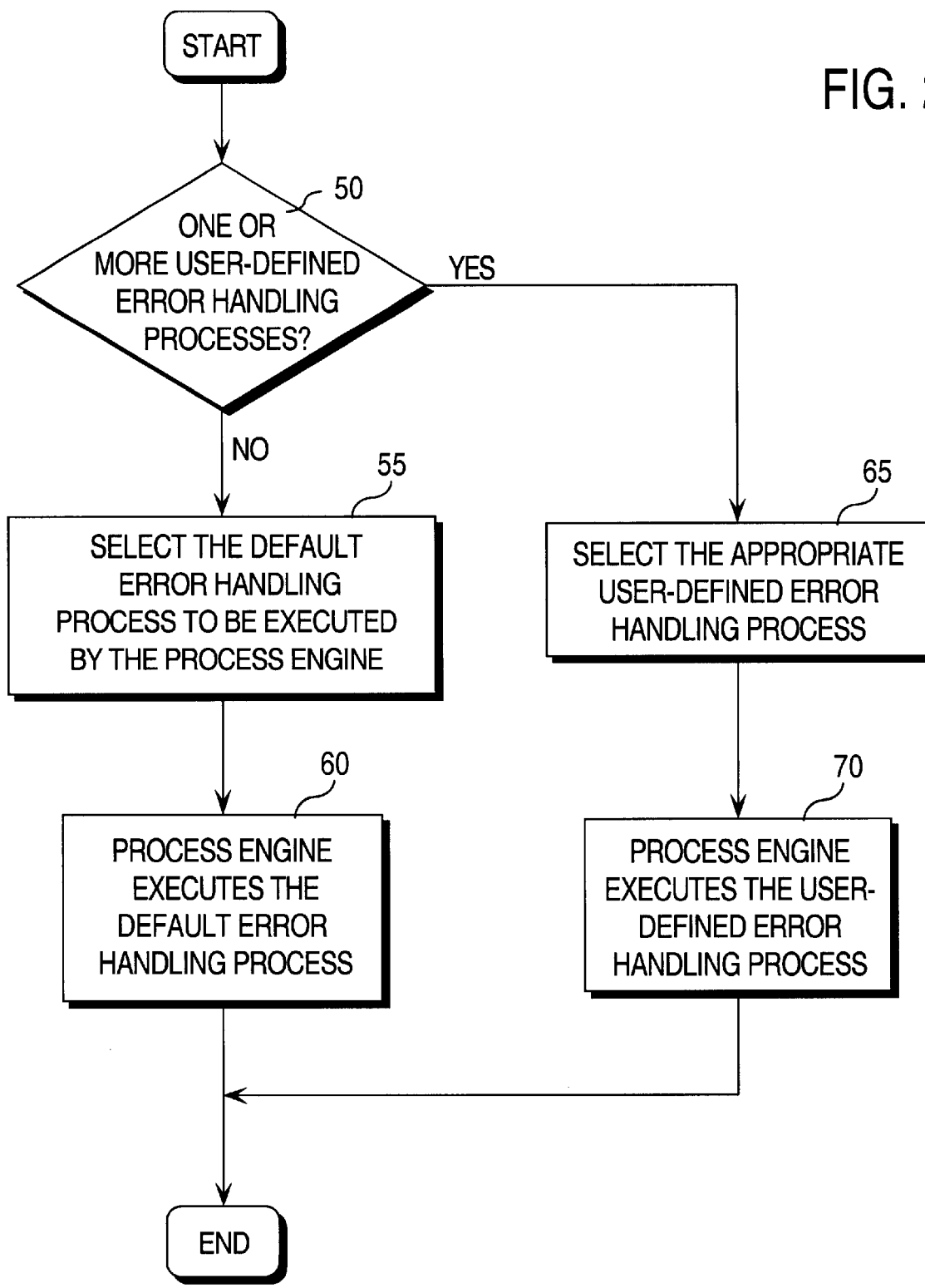
FIG. 2 is a flow diagram illustrating an embodiment of a procedure for selecting an appropriate error handling process.

FIG. 2 is a flow diagram illustrating an embodiment of a procedure for selecting an appropriate error handling process. At step 50, the process engine determines whether one or more user-defined error handling processes have been associated with the activity that generated the error. If no user-defined error handling processes are associated with the activity that generated the error, the procedure continues to step 55, where the process engine selects the default error handling process to be executed by the process engine. At step 60, the process engine executes the default error handling process.

If one or more user-defined error handling processes are associated with the activity that generated the error, then the procedure branches from step 50 to step 65, where the process engine selects the appropriate user-defined error handling process. The selection performed in step 65 is necessary in situations where multiple user-defined error handling processes have been associated with the activity that generated the error. If a single user-defined error handling process is associated with the activity, then the procedure continues to step 70 where the process engine executes the user-defined error handling process. However, if multiple error handling processes are associated with the activity, then the procedure branches to step 65 where the process engine selects the appropriate error handling process for this particular error situation. The selection among multiple error handling processes can be based on any number of parameters, attributes, or other information. For example, selection among different error handling processes may be based on the time of day, system utilization, or the user that invoked the activity. Additional details regarding user-defined error handling processes are discussed below. Once the proper user-defined error handling process has been selected at step 65, the procedure continues to step 70 where the process engine executes the selected user-defined error handling process.

Figure 3:
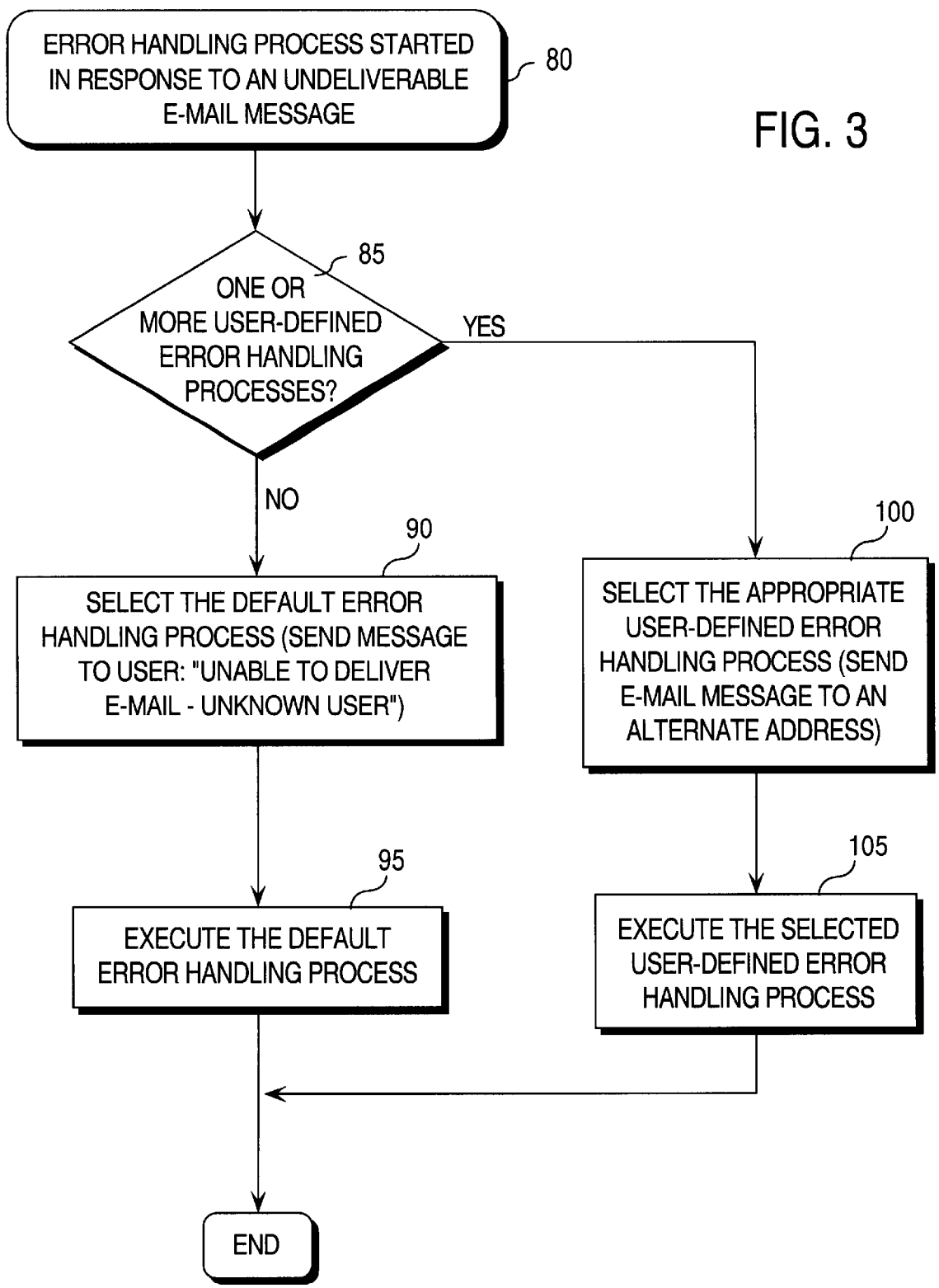
FIG. 3 is a flow diagram illustrating an embodiment of a procedure for handling an error that occurred as a result of an undeliverable e-mail message.

FIG. 3 is a flow diagram illustrating an embodiment of a procedure for handling an error that occurred as a result of an undeliverable e-mail message. At step 80, the error handling process is started in response to the identification of an undeliverable e-mail message. At step 85, the process engine determines whether one or more user-defined error handling processes are associated with the activity that generated the error. If no user-defined error handling processes are associated with the error, then the procedure continues to step 90 where the process engine selects the default error handling process. In this example, the default error handling process generates a message indicating that the e-mail message was undeliverable (such as "Unable to deliver e-mail—unknown user.") At step 95, the process engine executes the default error handling process by sending the appropriate message to the user.

If step 85 determines that one or more user-defined error handling processes are associated with the activity that generated the error, then the procedure branches to step 100 where the process engine selects the appropriate user-defined error handling process for the activity that generated the error. In this example, a single user-defined error handling process is defined which sends an e-mail message to an alternate address (i.e., a different e-mail recipient). At step 105, the process engine executes the selected user-defined error handling process by sending the previous undeliverable e-mail message to the alternate address. The alternate e-mail recipient may be the supervisor of the previous recipient or a person designated to receive all previously undeliverable e-mail messages (e.g., a system administrator).

In one embodiment of the invention, multiple user-defined error handling processes are associated with the error caused by the undeliverable e-mail message. In this embodiment, each user-defined error handling process "resends" the e-mail message to a different alternate recipient. For example, the alternate recipients may be the supervisors of the person to which the undeliverable e-mail message was sent. If this supervisor changes at different times of the day, then the alternate recipient also changes such that the correct supervisor receives the undeliverable e-mail message.

In another embodiment of the invention, a first user-defined error handling process "resends" the e-mail message to a supervisor if that supervisor is currently connected to the system. Otherwise, a second user-defined error handling process notifies the system administrator that the e-mail message was undeliverable.

Figure 4:
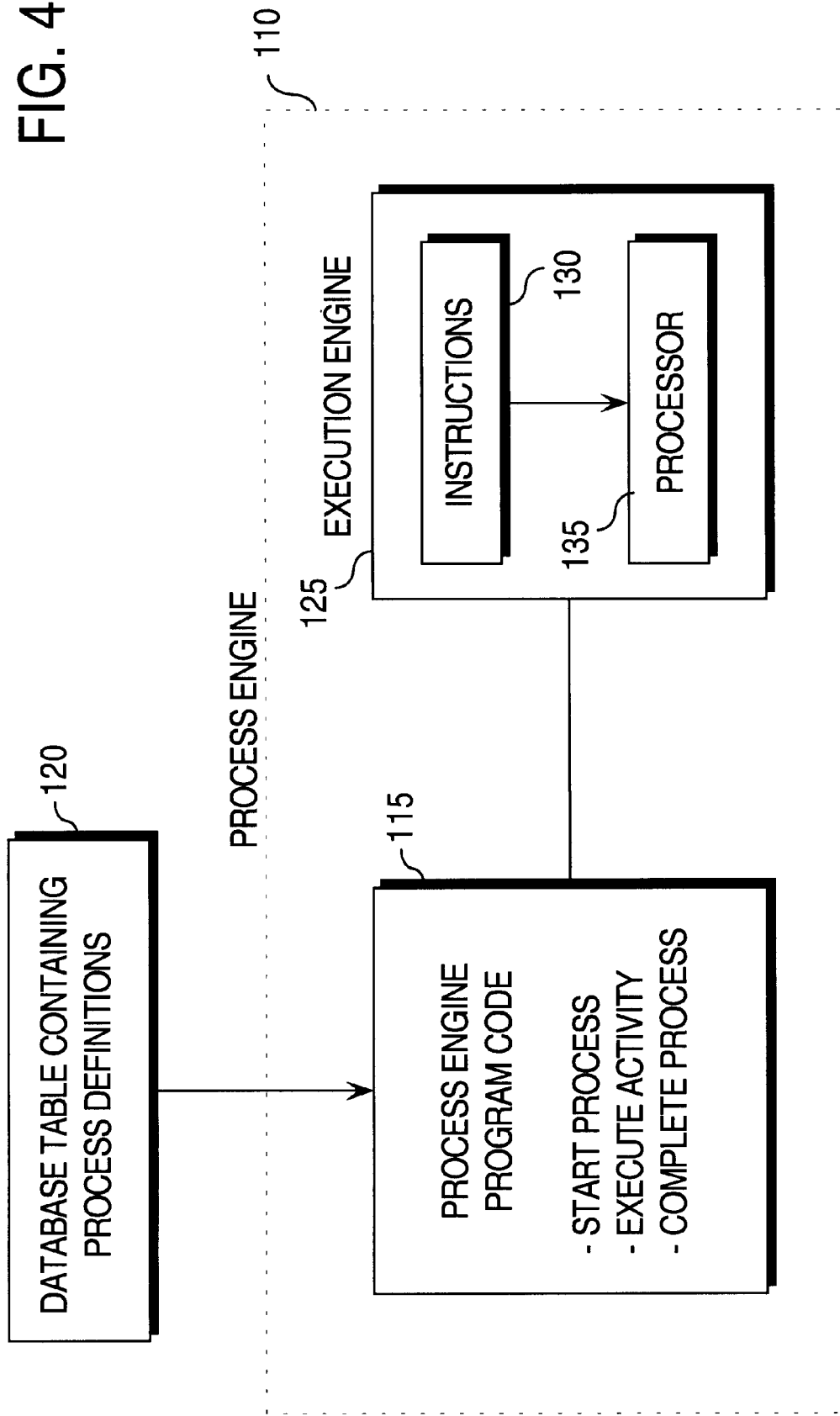
FIG. 4 illustrates an embodiment of a process engine and associated process definitions.

FIG. 4 illustrates an embodiment of a process engine 110 and associated process definitions. Process engine 110 is implemented by execution of process engine program code 115 and is itself used to execute process definitions stored in table 120. As shown in FIG. 4, process engine program code 115 is executed by an execution engine 125. In one embodiment of the present invention, the execution engine 125 is an embedded language subsystem implemented by execution of compiled instructions (machine code) 130 by processor 135. The embedded language subsystem executes the process engine program code 115 by interpreting the process engine program code from a predefined format (e.g., sequence of platform-independent byte-codes) into native machine instructions which are then executed by the processor. It will be appreciated that, in an alternate embodiment, the execution engine could be a processor and the process engine program code could be compiled machine code. In a preferred embodiment of the present invention, execution engine 125 is a PL/SQL™ interpretive engine and the process engine program code 115 is compiled PL/SQL code. PL/SQL is a trademark of Oracle Corporation.

Just as machine code 130 is executed by processor 135 to implement an execution engine 125, process engine program code 115 is executed by execution engine 125 to implement process engine 110. Process engine 110 constitutes a virtual machine for fetching process definitions from database table 120 and executing the indicated process activities. Error handling processes are executed by process engine 110 in the same manner as any other process.

Process engine 110 is capable of selecting among multiple error handling processes associated with a particular activity when an error occurs executing that activity. In one embodiment of the invention, error handling processes are stored in table 120, which contains various process definitions. In another embodiment of the invention, error handling processes are stored within process engine 110.

Various error handling parameters are passed to process engine 110 in response to the detection of an error or system failure. These error handling parameters provide various information regarding the status of the system when the error was occurred as well as information about the error itself. For example, the error handling parameters may include the activity generating the error, the instance of the process that generated the error, the name or identifier of the error that occurred, the identity of a person to notify, and the list of system status information at the time the error occurred. The error handling parameters are used by process engine 110 to select the proper error handling process to be executed.

Figure 5:
FIG. 5 illustrates three process definition tables used to hold process definitions according to one embodiment of the present invention.

FIG. 5 illustrates three process definition tables used to hold process definitions according to one embodiment of the present invention: a table of process names 140, a table of process activities 155, and a table of process transition logic 180. In one embodiment of the present invention, a process definition also includes one or more functions or procedures 200 stored in a database. The table of process names 140 includes a process name column 145 and a process description column 150. Process name column 145 contains respective entries identifying each process that can be executed in a system and process description column 150 contains process descriptions corresponding to the process name entries. For example, process name column 145 includes a process "Undeliverable E-Mail," which is executed in response to an undeliverable e-mail message. While the entries in the table of process names column 145 of table 140 are shown as being text-based, other types of process identifiers may also be used.

The table of process activities 155 includes an activity name column 160, an implementing function column 165, a process name column 170, and an activity attributes column 175. The table of process activities 155 contains respective entries for each of the activities included in a process defined in the table of process names 140. For example, since the table of process names 140 includes an undeliverable e-mail process, the table of process activities 155 would include respective entries for the various activities in the undeliverable e-mail process. An undeliverable e-mail process may include activities such as sending the e-mail message to an alternate address. The names of the various activities are listed in the activity name column 160, and respective values each identifying a function 200 to be called to execute a named activity are stored in the implementing function column 165. The name of the process to which the activity belongs is stored in the process name column 170, and the activity attributes column 175 is used to store information further characterizing a named activity.

The table of process transition logic 180 includes an activity name column 185, a branch activity column 190, and a branch condition column 195 for each activity listed in each process. Table 180 includes respective entries for each branch leading from each of the activities listed in the table of process activities 155. Activity name column 185 identifies the activity which precedes the branch activity listed in branch activity column 190. Branch condition column 195 contains the condition, if any, evaluated to determine whether a branch is to be taken. For each activity in a given process, the number of entries in the table of process transition logic 180 is equal to the number of branches leading from that activity. In this example, the Check Inventory activity has two different branches leading from the activity. Therefore, the Check Inventory activity is listed twice in the table of process transition logic 180. The branch activities corresponding to the Check Inventory activity are the Notify Filled activity and the Notify Back Ordered activity. In table 180, the branch condition for branch activity Notify Filled is that the requisitioned item is in stock, while the branch condition for activity Notify Back Ordered is that the requisitioned item is not in stock.

FIG. 6 illustrates an embodiment of an Item Activity Status (IAS) table in which status information is maintained during execution of a process. Herein, execution of a process according to a process definition is referred to as a process instance. Multiple instances of a process based on the same process definition may exist simultaneously. This would be the case, for example, if several errors of the same type or in the same activity occur during a particular time period, thereby causing the execution of multiple copies of the same error handling process. Each instance of the error handling process would be distinct and related to the particular error or activity that caused the process to be invoked, but each instance of the error handling process would be based on execution of the same process definition.

IAS table 210 is used to store information describing the activities executed in a process instance. Each time a process activity is executed, an entry is added to IAS table 210. IAS table 210 includes columns containing information respectively identifying the process name to which the executed activity corresponds 215, the process instance in which the activity is executed 220, the name of the process activity 225, the status of the process activity 230, the result of the process activity 235, and any errors encountered during execution of the activity 240. The activity status column 230 of the IAS table is used to indicate whether an activity is presently being executed, has completed execution or is awaiting input. The activity result column 235 is used to indicate the conditional result of the activity, if any. The error column 240 is used to identify errors encountered during execution of the process activity. This information is useful for troubleshooting a failed process.

Figure 7:
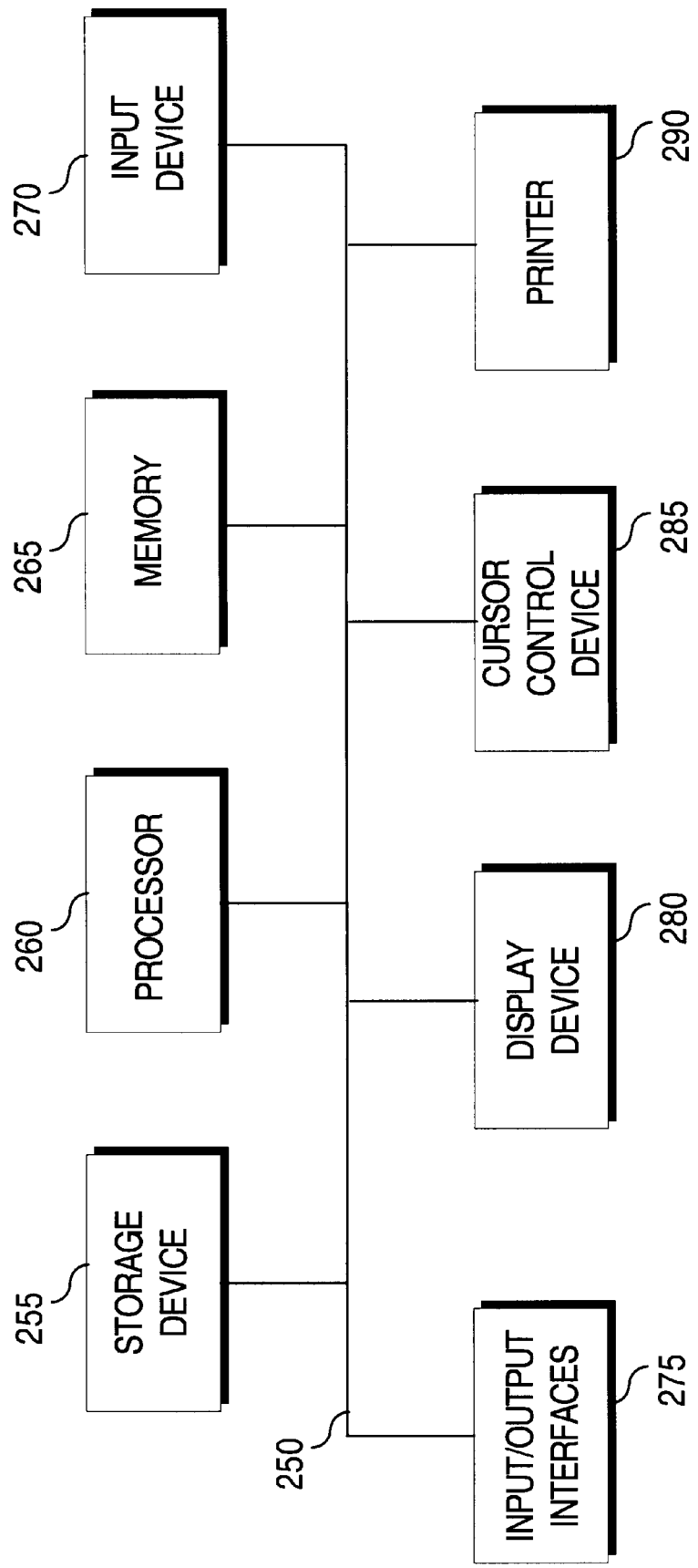
FIG. 7 illustrates an embodiment of a processor-based system capable of operating as a process engine.

FIG. 7 illustrates an embodiment of a processor-based system capable of operating as a process engine. A storage device 255 is coupled to a processor 260 using a bus 250. Storage device 255 may be any type of storage device, including a magnetic storage device or an optical storage device. A memory 265 is coupled to processor 260 and may include various types of memory, such as random access memory (RAM), read-only memory (ROM), cache memories, and other memory storage devices. An input device 270 is coupled to processor 260 and provides a mechanism for entering information into the processor-based system.

One or more input/output interfaces 275 are coupled to processor 260 and permit the communication of information to or from external devices coupled to interface 275. Interface 275 allows these external devices to communicate with processor 260 and the other components of the processor-based system shown in FIG. 7. A display device 280 provides a mechanism for displaying information generated by or stored in the system. A cursor control device 285 is used to select and otherwise manipulate information, for example, in a graphical environment. A printer 290 is also coupled to processor 260 and is capable of producing a hard copy of information stored in or generated by the processor-based system.

Although FIG. 7 illustrates various system components coupled to a single bus or communication link, it will be appreciated that a particular processor-based system may include multiple buses and multiple communication links between various components of the system.

Embodiments of the present invention may include code sequences, instructions, parameters, and other information stored on a processor-readable medium (also referred to as a computer-readable medium). The code sequences, instructions, parameters, and other information are used to perform various data processing and error handling operations, such as the procedures described herein. The processor-readable medium may be any type of magnetic, optical, or electrical storage medium including a disk, diskette, CD-ROM, memory device, or similar storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for handling an error associated with an application in a computer system, the method comprising:

receiving, from a user, user input that specifies error handing actions for one or more error conditions;

based on said user input, storing separate from said application, data that associates said error handling actions with one or more error conditions, wherein said stored data docs not consist of executable instructions;

in response to occurrence of the error, identifying an error condition associated with error;

causing the application to read said stored data in order to determine error handling actions that are associated with said err condition; and performing said error handling actions that said stored data associates with said error condition.

2. The method of claim 1 wherein default error handling actions are provided to handle the error and wherein receiving user input includes receiving, from a user, user input that specifies error handling actions for one or more error conditions to be performed instead of said default error handling actions.

3. The method of claim 1 wherein identifying said error condition associated with the error includes identifying an error type associated with the error.

4. The method of claim 1 wherein identifying said error condition associated with the error includes identifying an activity that was being performed when the error occurred.

5. The method of claim 1 wherein the error is associated with a plurality of error conditions and identifying said error condition includes selecting said error condition from among said plurality of error conditions.

6. The method of claim 5 wherein selecting said error condition includes analyzing at least one error handling parameter to select among the plurality of error conditions.

7. The method of claim 1 wherein a second error occurs and further comprising:

performing said error handling actions in response to the occurrence of the second error.

8. A computer-readable medium carrying one or more sequences of instructions for handling an error associated with an application in a computer system, which instructions, when executed by one or more processors, cause the one or more processors to carry out the step of:

receiving, from a user, user input that specifies error handling actions for one or more error conditions;

based on said user input, storing separate from said application, data that associates said error handling actions with one or more error conditions, wherein said stored data does not consist of executable instruction;

in response to occurrence of the error, identifying an error condition associated with the error;

causing the application to read said stored data in order to determine error handling actions that are associated with said error condition; and performing said error handling actions that said stored data associates with said error condition.

9. The computer-readable medium of claim 8 wherein default error handling actions are provided to handle the error and wherein receiving user input includes receiving, from a user, user input that specifies error handling actions for one or more error conditions to be performed instead of said default error handling actions.

10. The computer-readable medium of claim 8 wherein identifying said error condition associated with the error includes identifying an error type associated with the error.

11. The computer-readable medium of 8 wherein identifying said error condition associated with the error includes identifying an activity that was being performed when the error occurred.

12. The computer-readable medium of claim 8 wherein the error is associated with a plurality of error conditions and identifying said error condition includes selecting said error condition from among said plurality of error conditions.

13. The computer-readable medium of claim 12 wherein selecting said error condition includes analyzing at least one error handling parameter to select among the plurality of error conditions.

14. The computer-readable medium of claim 8 wherein a second error occurs and further comprising instructions for performing the step of:

performing said error handling actions in response to the occurrence of the second error.

15. An apparatus for handling an error associated with an application in a computer system, comprising:

a database that includes data associating error handling actions with one or more error conditions, wherein said data is stored separate from said application in response to receiving user input that specifies error handing actions for one or more error conditions, and wherein said stored data does not consist of executable instructions; and an execution engine that, in response to occurrence of the error, identifies an error condition associated with the error, causes the application to read said stored data in order to determine error handling actions that are associated with said error condition, and performs said error handling actions that said stored data associates with said error condition.

16. The apparatus of claim 15 wherein said execution engine is configured to execute default error handling actions to handle the error and said user input specifies error handling actions for one or more error conditions to be performed instead of said default error handling actions.

17. The apparatus of claim 15 wherein said execution engine is configured to identify the error condition associated with the error by identifying an error type associated with the error.

18. The apparatus of claim 15 wherein said execution engine is configured to identify the error condition associated with the error by identifying an activity that was being performed when the error occurred.

19. The apparatus of claim 15 wherein the error is associated with a plurality of error conditions and said execution engine is configured to identify said error condition associated with the error by selecting said error condition from among said plurality of error conditions.

20. The apparatus of claim 19 wherein said execution engine is configured to select said error condition by analyzing at least one error handling parameter to select among the plurality of error conditions.

21. The apparatus of claim 15 wherein a second error occurs and said execution engine is configured to perform said error handling actions in response to the occurrence of the second error.

22. The apparatus of claim 15 wherein the execution engine is a Procedural Language/Structured Query Language interpretive engine.

\* \* \* \* \*